Figure 1:
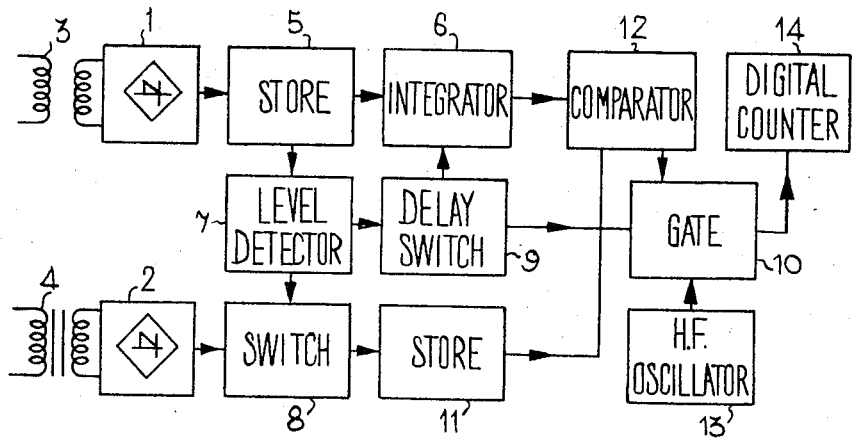

Oct. 25, 1966  P. RICHARDSON  3,281,673
APPARATUS FOR DETECTING THE LOCATION OF AN ELECTRIC
LINE FAULT INCLUDING MEANS FOR COMPARING
THE VOLTAGE AND CURRENT OF THE LINE
Filed Dec. 5, 1963

United States Patent Office 3,281,673
Patented Oct. 25, 1966

3,281,673
APPARATUS FOR DETECTING THE LOCATION OF AN ELECTRIC LINE FAULT INCLUDING MEANS FOR COMPARING THE VOLTAGE AND CURRENT OF THE LINE
Philip Richardson, Rugby, England, assignor to Associated Electrical Industries Limited, London, England, a British company
Filed Dec. 5, 1963, Ser. No. 328,360
Claims priority, application Great Britain, Dec. 7, 1962, 46,302/62
6 Claims. (Cl. 324—52)

This invention relates to apparatus for determining the distance between an earth or short-circuit fault along an A.C. transmission line and a detecting station connected to the line. It aims at providing an improved arrangement which does not necessitate detecting means at more than one station, or a plurality of "distance relays" having graded time characteristics, as has been conventional up to now.

If the flow of fault current and the line voltage are measured in the interval between the occurrence of a fault and fault clearance, by a circuit breaker for instance, the impedance of the line section, and for a line of known impedance the distance between the detecting station and the fault can be determined if means are provided to integrate the rectified fault current with respect to time, and to measure the time taken until the value of said integral attains the value of the rectified line voltage. This will be seen from the following equations:

$$I \cdot t = CV \quad (1)$$

$$t = \frac{CV}{I} \quad (2)$$

$$Z = \frac{V}{I} \quad (3)$$

$$Z = \frac{t}{C} \quad (4)$$

wherein $I$ is the current proportional to the peak fault current, $V$ is a voltage proportional to the peak line voltage during the fault, $t$ is time, $C$ is the integrator capacitance and $Z$ is the impedance seen by the meter.

In other words if means are provided to integrate rectified fault current with respect to time, and to measure the time taken until the value of said integral attains the value of the rectified line voltage, the impedance of the line section between the apparatus and fault can be determined. If the impedance values of various line sections are known, the distance of a fault point along the line from the detecting station, that is the location of the fault, can thus be readily detected.

Accordingly this invention resides in apparatus for detecting the location of a fault along an A.C. transmission line comprising a first means for producing a D.C. voltage corresponding to the rectified current of the line, a second means for producing a D.C. signal corresponding to the rectified voltage of the line, a first store which may also be designated "storage means" supplied from said first means, a second store supplied from said second means, an integrator supplied from said first store, a switch for starting said integrator, a detector sensing the level to which said first store is charged, said switch being responsive to said detector to start said integrator when said level attains a predetermined value, a second switch between the aforementioned second means and second store, said second switch being controlled by said sensing detector to interrupt when said level of predetermined value occurs, a comparator for comparing signals received from said integrator and second store, a local generator, a gate connected between the local generator and a measuring device, the opening of said gate for conduction being controlled by the said first switch and its closing for interruption being controlled by said comparator.

In a preferred embodiment the measuring device is a digital counter, the local generator is formed by a source of oscillations or pulses and the stores or storage means comprises capacitors. The frequency of the local oscillations or pulses is a multiple, conveniently 100 times, the frequency of the line current.

Figure 2:
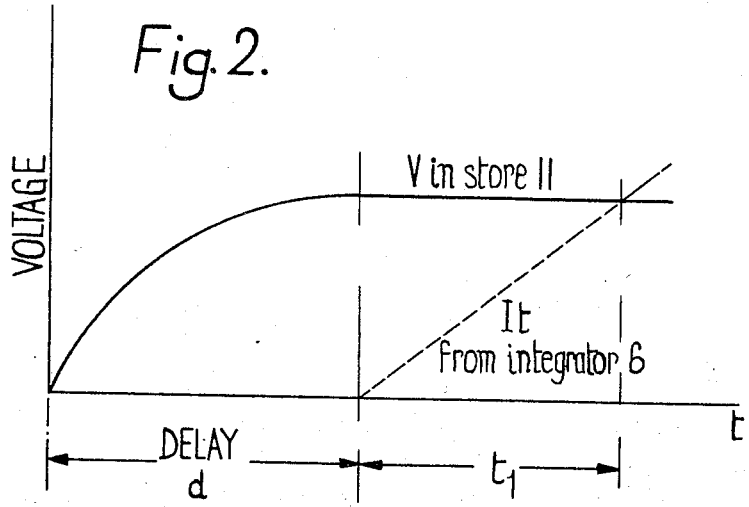

More details will become apparent and the invention will be better understood from the following description referring to the accompanying drawings, in which:

FIG. 1 shows by way of example a block diagram of a circuit arrangement embodying the invention; and FIG. 2 shows a graph explaining its operation.

Referring to FIG. 1 a first signal comprising a D.C. voltage which represents the fault current, is derived through a mutual inductance 3 which has a primary winding connected to the line and has a secondary winding connected to a rectifier 1. The signal is supplied to a store 5, conveniently formed by a long-time constant capacitor and discharge resistor element which is charged-up by the signal so that the voltage across the capacitor is proportionate to the line current. A means must be provided to suppress action until fault current occurs which exceeds the normal line current. To this end the current signal store 5 is connected to a level detector 7, while an integrator 6, conveniently of the capacitance current feed back of Miller type, supplied from the current store 5 is controlled by a delay switch 9 which is responsive to the level detector 7, so as to start integrator operation when the signal representative of line current exceeds a predetermined limit set into the level detector.

A D.C. signal corresponding to the rectified line voltage is provided from a rectifier 2 which is connected through a transformer 4 to the line. The output from the rectifier 2 is supplied to a voltage value store 11 through a second switch 8. The store 11 again comprises a capacitor and the switch 8 is controlled by the level detector to interrupt and hold the actual line voltage in store 11 when the aforementioned predetermined level of the current signal is exceeded.

A comparator 12 has its input connected to the integrator 6 and voltage value store 11 and operates to compare these values. A gate 10 has its input connected to a generator 13 of high frequency oscillations or pulses. The gate is opened through the delayed switch 9, after the level detector 7 has operated this switch, and is closed by a signal from the comparator 12 when the output from integrator 6 equals the line voltage value held in and supplied from the store 11. Thus the number of cycles or pulses from 13 passed through the gate 10 is a measure of the time $t$ and a suitable means, such as a digital counter 14, is provided to display a value which corresponds to the time $t1$ (FIG. 2).

In FIG. 2 the line voltage $V$ is plotted against time $t$. After a time delay $d$ provided by detector 7 to ensure opening of the switch 9 at fault current only, the integrator 6 starts operating and its output provides a voltage which is proportionate to the sum of current increments multiplied by time increments. When this current-time integral attains the value of the line voltage $V$ the comparator operates to close the gate. The time interval $t1$ between opening and closing of the gate 10 provides a measure of the impedance of the length of the line section between the test station and fault, since the line has a known impedance, thereby of the location of the fault as indicated by Equation 4.

In order to ensure accurate results the arrangement is such that the operation is completed before a fault is cleared or very shortly thereafter, before the voltage of the current values store 5 has fallen, due to leakage in the storing capacitor for instance. The gate opening for the maximum distance to be measured should therefore be of the order of one cycle of the line frequency or less. For instance, on a 50 cycles per second line, a fault distance can be determined with an accuracy of 1% if the generator 13 operates at a frequency of 5000 cycles per second, and the display can be shown in percentages of the total impedance setting, expressed for instance by the counts appearing on the counter 14.

While a preferred embodiment of the invention has been shown and described it will be understood that variations are possible without departing from the invention as defined by the appended claims. Instead of the digital counter 14 a recording instrument could be operated through the gate 10.

What I claim is:

1. Apparatus for detecting the location of a fault along an A.C. transmission line comprising a first means for producing a D.C. voltage corresponding to the rectified current of the line, a second means for producing a D.C. signal corresponding to the rectified voltage of the line, a first storage means supplied from said first means for storing said D.C. voltage, a second storage means supplied from said second means for storing said D.C. signal, an integrator supplied from said first storage means, a switch for starting said integrator, a detector sensing the voltage level to which said first storage means is charged, said switch being responsive to said level detector to start said integrator when said voltage level attains a predetermined value, a second switch between the aforementioned second means and second storage means, said second switch being controlled by said voltage level sensing detector to interrupt said D.C. signal supplied to the second storage means when said voltage level of predetermined value occurs, a comparator for comparing signals received from said integrator and second storage means, a local generator, gate means connected between the local generator and a measuring device, the opening of said gate means for conduction of the output signal from said local generator being controlled by the said first switch and its closing for interruption of said local generator output signal being controlled by said comparator.

2. Apparatus as claimed in claim 1, wherein the local generator produces oscillations.

3. Apparatus as claimed in claim 1, wherein the local generator produces pulses.

4. Apparatus as claimed in claim 1, wherein the measuring device comprises a digital counter.

5. Apparatus as claimed in claim 1, wherein the storage means comprise capacitors.

6. Apparatus as claimed in claim 1, wherein the frequency of the local generator is substantially greater than the line frequency.

No references cited.

WALTER L. CARLSON, *Primary Examiner.*

G. R. STRECKER, *Assistant Examiner.*